3,342,899
**PROCESS FOR POLYMERIZING TETRAFLUORO-
ETHYLENE IN CONTINUOUS MANNER USING
HIGH ENERGY IONIZING RADIATION**
Arthur C. Doumas, Lake Jackson, Tex., assignor to The
Dow Chemical Company, Midland, Mich., a corporation of Delaware
Filed July 20, 1962, Ser. No. 211,198
7 Claims. (Cl. 260—877)

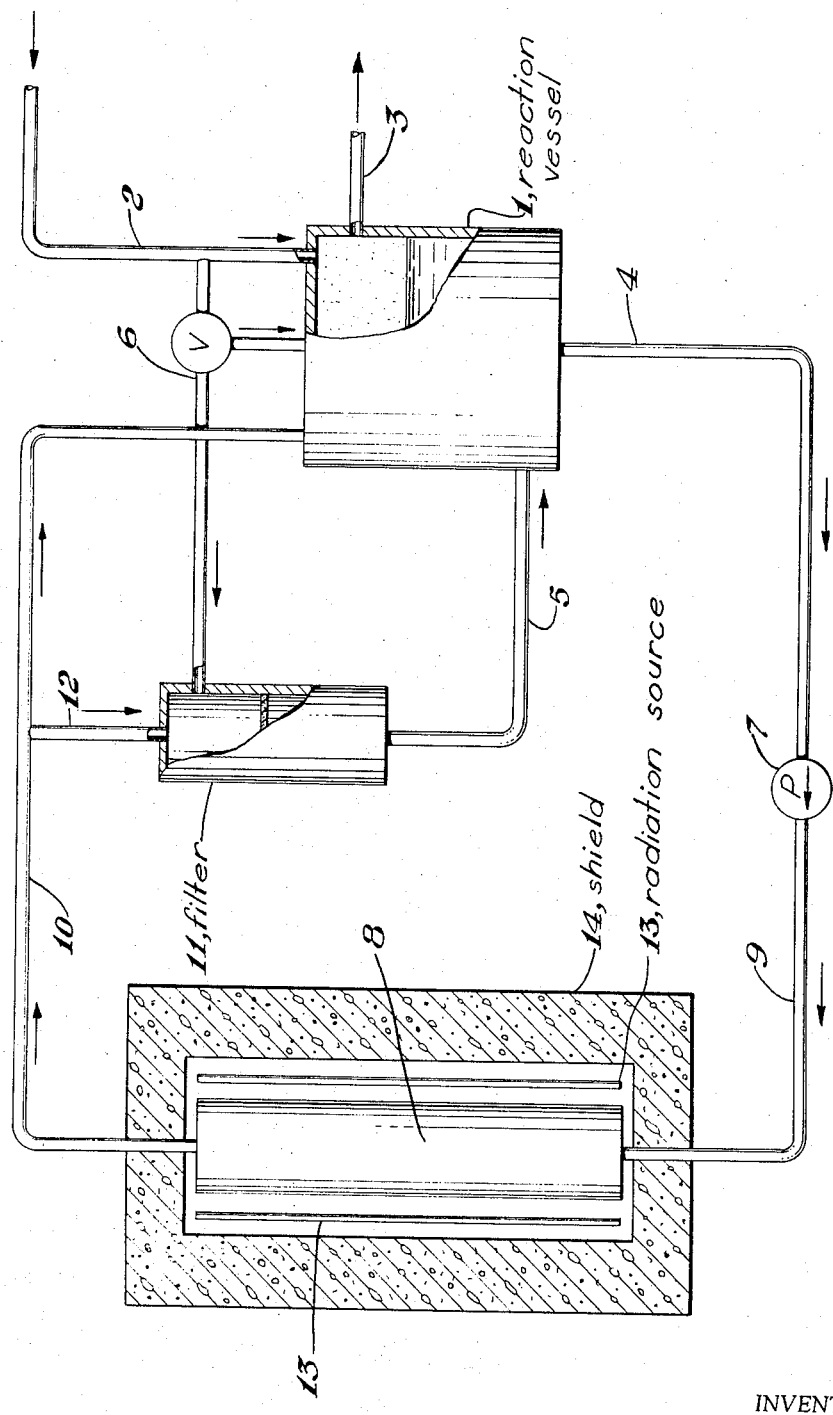

This invention concerns a process for polymerizing tetrafluoroethylene in continuous manner and pertains especially to a novel method for making graft copolymers by the use of high energy ionizing radiation.

It is known to prepare graft copolymers by subjecting a polymeric substance to high energy ionizing radiations and thereafter contacting the irradiated polymer with a monomer polymerizable by free radicals, and to prepare graft copolymers by irradiating the polymer with high energy ionizing radiations while it is in contact with a monomer polymerizable by free radicals. It is known to prepare polymers by subjecting monomers to the action of high energy ionizing radiations. For example, U.S. Patent No. 2,865,824 polymerizes 1,1,2-trifluoro-2-chloroethylene by subjecting the compound to the action of gamma rays at temperatures between $-15°$ and $15°$ C. Other fluoroethylene compounds, e.g. tetrafluoroethylene, can be polymerized by action of high energy ionizing radiations, however, the method has not been entirely satisfactory for the reasons that the polymerization is exothermic and if not controlled may result in a run-away reaction, and polytetrafluoroethylene decomposes when subjected to large doses of high energy ionizing radiation.

Accordingly, it is a primary object of the invention to provide a process for carrying out the polymerization of tetrafluoroethylene, which avoids the heretofore known disadvantages. Another object is to provide a process for carrying out the polymerization of tetrafluoroethylene in continuous manner under the action of high energy ionizing radiations. A further object is to provide a process for polymerizing tetrafluoroethylene in continuous manner in admixture with an irradiated polymer of tetrafluoroethylene as the sole polymerization initiator and in the presence of an inert aqueous suspending medium. Other and related objects may appear from the following description of the invention.

According to the invention tetrafluoroethylene can readily be polymerized or graft copolymerized by feeding monomeric tetrafluoroethylene to a polymerization zone and into contact with a finely divided tetrafluoroethylene polymer, i.e. a homopolymer of tetrafluoroethylene or a copolymer of a predominant amount by weight of tetrafluoroethylene and a minor amount of another ethylenically unsaturated fluoro compound, such as hexafluoropropene, suspended in water, preferably a tetrafluoroethylene polymer that has previously been subjected to the action of high energy ionizing radiations with a dose effective to initiate polymerization of the monomeric tetrafluoroethylene; withdrawing from said polymerization zone a liquid body comprising polymerized tetrafluoroethylene suspended in water; feeding a portion of said liquid body to a filtering means wherein the polymer is separated from the water; passing the remaining portion of said liquid body through a field of high energy ionizing radiation of an intensity of at least 40,000 rads per hour; subjecting the polymer in said liquid body to said high energy ionizing radiation for a dose effective to initiate polymerization of monomeric tetrafluoroethylene; then feeding the aqueous suspension of the irradiated polymer into a polymerization zone and contacting it with monomeric tetrafluoroethylene while continuing to feed monomeric tetrafluoroethylene into said polymerization zone at a rate not substantially greater than the rate the monomer is consumed in the polymerization reaction.

The invention is described more particularly with reference to the accompanying drawing which is a diagrammatic flow sheet showing an arrangement of apparatus suitable for practice of the invention.

In the drawing the numeral 1 indicates a polymerization vessel having an inlet 2 for feed of monomeric tetrafluoroethylene thereto, an outlet 3, a discharge outlet 4 and inlets 5 and 6. The numeral 7 indicates a pump connected to radiation zone 8, by conduit 9. Conduit 10 connects radiation zone 8, with filter means 11 via conduit 12 and with polymerization vessel 1. A radiation source 13, e.g. cobalt-60, is positioned adjacent to vessel 8 and suitably so that it can be removed by lowering into a cave, and is surrounded by suitable shielding materials 14.

The high energy ionizing radiation to be employed in the process can be gamma rays, beta-rays, x-rays, or high speed electrons. Convenient sources of such high energy radiations are cobalt-60, X-ray machines, linear accelerators, Van de Graaff accelerators, or resonance transformers. The high energy ionizing radiation should be a field of an intensity of at least 40,000, preferably 100,000, rads per hour so that a dose effective to initiate polymerization of monomeric tetrafluoroethylene can readily be applied to the polymer in a relatively short period of time.

The tetrafluoroethylene polymers to be employed as starting or "seed" material can be a homopolymer of tetrafluoroethylene or a copolymer of a major proportion by weight of tetrafluoroethylene and a minor amount of another fluoroethylene compound copolymerizable therewith, e.g. hexafluoropropene. The polymer should be in finely divided form, e.g. in the form of a powder or particles of sizes not greater than about 50 mesh per inch as determined by U.S. Standard screens. The starting polymer can be used in any desired amount, but is usually employed in an amount of from about 5 to about 20 parts by weight per 100 parts by weight of the water used as suspending medium.

It is important that the water be pure or substantially free from solutes such as salts, or oxygen, carbon dioxide, and the like. The water is preferably deionized or distilled water free from dissolved gases.

In practice of the invention employing an arrangement of apparatus similar to that shown in the drawing, a charge of deionized or distilled water is placed in polymerization vessel 1, together with a desired quantity of finely divided seed polymer, e.g. an amount of powdered polytetrafluoroethylene corresponding to from 5 to 20 percent by weight of the water. The vessel is closed. The system is evacuated via outlet 3 to remove air or dissolved gases in the system and water, then is filled with gaseous monomeric tetrafluoroethylene fed to the system via inlet 2. Best results are obtained by evacuating the system, filling with gaseous tetrafluoroethylene, re-evacuating and refilling the system with tetrafluoroethylene gas or vapors for a plurality of times prior to start-up of the polymerization. After removal of air or contaminant gases from the system the polymerization vessel and system is filled with gaseous monomeric tetrafluoroethylene fed thereto via inlet 2 to about 1 to 10 pounds per square inch gauge pressure. Pump 7 is started and circulates the suspension of polymer in water via conduit 9, through radiation zone 8 wherein it is subjected to gamma rays from cobalt-60 source 13, then passes via conduit 10 back to polymerization vessel 1, wherein it is contacted with monomeric tetrafluoroethylene, and from which vessel a suspension of polymer is withdrawn and passes via conduit 4 to pump 7. The polymer suspension is circulated through the gamma ray field until the polymer has been

3 subjected to a dose, e.g. to a dose of from about 0.01 to 5 megarads, effective to initiate polymerization of the monomeric tetrafluoroethylene. Thereafter, circulating of the polymer suspension through the high energy ionizing radiation field is discontinued and polymerization of the monomer is allowed to proceed. The polymerization proceeds at a rate which gradually decrease with time. When the rate of polymerization becomes undesirably low, a portion of the polymer suspended in water is circulated through the radiation field and re-activated as catalyst material. The polymer is recovered by feeding the suspension via conduit 12 to filtering vessel 11 wherein the polymer is separated and the water is passed via conduit 5 back into the polymerization vessel 1. In a preferred practice, the polymer separated from the water in filtering vessel 11, is contacted with monomeric tetrafluoroethylene fed thereto via conduit 6, and the polymerization of the monomer allowed to proceed until the rate of polymerization becomes undesirably low. Thereafter, the feed of monomer via conduit 6 is discontinued and the polymer is removed from filtering vessel 11.

The invention provides an improved process for carrying out the polymerization of tetrafluoroethylene in continuous manner and avoids the occurrence of an exothermic runaway polymerization reaction and provides means for readily controlling the reaction both as regards the feed of monomer to the reaction and as to the activation of the polymer as seed or catalyst material.

The following examples illustrate ways in which the principle of the invention has been applied but is not to be construed as limiting its scope.

*Example 1*

(A) In an arrangement of apparatus similar to that shown in the drawing and comprising a 2-inch internal diameter by 20 inches long glass pipe as polymerization vessel, a 1⅜ inch internal diameter by 19½ inches long glass radiation vessel, a filter vessel, a 13 liter per minute positive displacement pump, all interconnected with suitable tubing for carrying out the process as herein described, and with the radiation vessel placed adjacent to an externally shielded cobalt-60 source of radiation intensity sufficient to supply 0.055 megarad per hour at the center of the radiation vessel, there was placed one liter of deoxygenated distilled water. Fifty grams of powdered polytetrafluoroethylene was placed in the polymerization vessel together with the water therein. The system was closed and was evacuated. It was alternately evacuated and back-filled with $C_2F_4$ monomer three times to remove residual oxygen. The system was then filled with $C_2F_4$ monomer to 5 pounds per square inch gauge pressure. The pump was started and the suspension of polytetrafluoroethylene in water was circulated through the radiation field for a period of 9 hours for a total dose to the polymer of about 0.5 megarad. Thereafter, the suspension was passed through the filter vessel and the polymer was separated from the water. After separating the polymer the pump was stopped and the conduits leading to the radiation vessel were closed. Tetrafluoroethylene monomer was then contacted with the polymer, separated from the water in the filter vessel, at a pressure of 5 pounds per square inch gauge pressure, and polymerization of the monomer was allowed to continue for a period of 31 hours. Thereafter, the entire system was evacuated, the filter chamber was disassembled and the polymer was recovered and was washed and dried. There was obtained 200 grams of product. The yield of new polymer was 150 grams.

(B) In a similar experiment wherein the polymerization was continued in the filter vessel for a period of 85 hours, the yield of new polymer was 324 grams.

(C) In a similar experiment, except that no polymerization was carried out in the filter vessel the yield of new polymer was 118 grams.

*Example 2*

In an arrangement of apparatus similar to that shown in the drawing and similar to that described in Example 1, except that the polymerization vessel was a 5 liter capacity glass vessel, there was placed 3.5 liters of deionized water and 175 grams of polytetrafluoroethylene powder. The system was evacuated then filled with gaseous tetrafluoroethylene to 5 pounds per square inch gauge pressure. The monomeric tetrafluoroethylene was maintained at this pressure throughout the experiment. The pump was started and the suspension of polytetrafluoroethylene in the water was circulated through the gamma ray radiation field for a period of 6.75 hours for a dose of about 0.35 megarad. Thereafter the polymer was separated from the water by filtering in the filter vessel. Polymerization of monomer was continued in the filter vessel for a period of 65 hours. There was obtained 850 grams of product. The yield of new polymer was 675 grams.

*Example 3*

The experiment of Example 2 was separated, except using a charge of 175 grams of the polymer product obtained in said example as starting material, circulating the polymer suspension through the gamma ray field for a period of 2 hours and a dose of about 0.1 megarad and allowing polymerization of monomeric tetrafluoroethylene to continue in the filter vessel for a period of 71 hours. There was obtained a yield of 288 grams of new polymer.

*Example 4*

The experiment of Example 3 was repeated, except using 175 grams of the polymer obtained in said example as starting material, circulating the polymer suspension through the gamma ray field for a dose of about 0.35 megarad, and allowing polymerization of the monomeric tetrafluoroethylene to continue in the filter vessel for a period of 189 hours. There was obtained 4440 grams of new polymer.

Similar results are obtained by employing a copolymer of a predominant amount by weight of tetrafluoroethylene and a minor amount of another ethylenically unsaturated fluoro compound such as hexafluoropropene in place of the homopolymer of tetrafluoroethylene employed in the foregoing examples.

I claim:
1. A process for polymerizing tetrafluoroethylene which comprises feeding monomeric tetrafluoroethylene to a polymerization zone and into contact with particles of a solid polymer consisting of at least a predominant amount of tetrafluoroethylene and not more than a minor amount of another ethylenically unsaturated fluoro compound copolymerizable therewith, suspended in water; withdrawing from said polymerization zone a liquid body comprising said polymer suspended in water, passing said liquid body through a field of high energy ionizing radiation of an intensity of at least 40,000 rads per hour and subjecting the polymer therein to irradiation with a dose effective to initiate polymerization of monomeric tetrafluoroethylene upon contacting said monomer with said irradiated polymer, passing a portion of the suspension of the irradiated polymer to a filtering means and separating the polymer from the water, passing a portion of the suspension of the irradiated polymer into and contacting it with the monomeric tetrafluoroethylene fed to said polymerization zone, and continuing the process while feeding the monomeric tetrafluoroethylene to said polymerization zone at a rate not substantially greater than it is consumed in the polymerization reaction.

2. A process according to claim 1, wherein the polymerization is carried out at temperatures between about 0° and 75° C.

3. A process according to claim 1 wherein the polytetrafluoroethylene polymer is a copolymer of a predominant amount by weight of tetrafluoroethylene and a minor proportion by weight of hexafluoropropene.

4. A process according to claim 1, wherein the tetrafluoroethylene polymer is polytetrafluoroethylene.

5. A process according to claim 1, wherein the high energy ionizing radiation is gamma rays.

6. A process for polymerizing tetrafluoroethylene which comprises feeding monomeric tetrafluoroethylene to a polymerization zone and into contact with particles of a solid polymer consisting of at least a predominant amount by weight of tetrafluoroethylene and not more than a minor amount of another ethylenically unsaturated fluoro compound copolymerizable therewith, suspended in water, withdrawing from said polymerization zone a liquid body comprising said polymer suspended in water, passing said liquid body through a field of high energy ionizing radiation of an intensity of at least 40,000 rads per hour and subjecting the polymer therein to a dose of from 0.001 to 5 megarads, passing a portion of the liquid body to a filtering means and separating the polymer from the water, passing another portion of the liquid body containing irradiated polymer in suspension into the polymerization zone and contacting it with monomeric tetrafluoroethylene, and continuing the process while feeding monomeric tetrafluoroethylene to said polymerization zone and into contact with the polymer at a rate not substantially greater than it is consumed in the polymerization reaction.

7. A process for polymerizing tetrafluoroethylene which comprises feeding monomeric tetrafluoroethylene to a polymerization zone and into contact with finely divided particles of solid polytetrafluoroethylene suspended in water, withdrawing from said polymerization zone a liquid body comprising polytetrafluoroethylene suspended in water, passing at least a portion of said liquid body through a field of high energy ionizing radiation consisting predominantly of gamma rays of an intensity of at least 40,000 rads per hour and subjecting the polymer in said suspension to a total dose of from 0.001 to 5 megarads, feeding the suspension of the irradiated polymer into said polymerization zone and contacting it with monomeric tetrafluoroethylene, and continuing the process while feeding monomeric tetrafluoroethylene to said polymerization zone at about the rate it is consumed in the polymerization reaction.

References Cited

UNITED STATES PATENTS

| | | | |
|---|---|---|---|
| 2,961,389 | 11/1960 | Hines et al. | 204—159.2 |
| 2,991,269 | 7/1961 | Nozaki | 204—154.1 |
| 3,058,899 | 10/1962 | Yanko et al. | 204—159.22 |
| 3,065,157 | 11/1962 | Busse | 204—159.17 |
| 3,102,087 | 8/1963 | Jobard | 204—159.23 |
| 3,116,226 | 12/1963 | Bowers | 204—159.2 |

FOREIGN PATENTS

| | | |
|---|---|---|
| 499,577 | 1/1954 | Canada. |
| 1,121,084 | 4/1956 | France. |
| 1,158,542 | 1/1958 | France. |

OTHER REFERENCES

Chapiro: Radiation Chemistry of Polymeric Systems, John Wiley and Sons Publ., N.Y. 1962, pp. 526, 529–532.

SAMUEL H. BLECH, *Primary Examiner.*

MURRAY TILLMAN, WILLIAM SHORT,
*Examiners.*

N. G. OBLON, R. B. TURER, *Assistant Examiners.*